United States Patent [19]

Van Gerpen

[11] E Re. 29,671

[45] Reissued Jun. 20, 1978

[54] DEMAND COMPENSATED HYDRAULIC SYSTEM WITH FLOW SENSITIVE DEVICE

[75] Inventor: Harlan Welbert Van Gerpen, Cedar Falls, Iowa

[73] Assignee: Deere & Company, Moline, Ill.

[21] Appl. No.: 809,562

[22] Filed: Jun. 24, 1977

Related U.S. Patent Documents

Reissue of:

[64] Patent No.: 4,004,418
Issued: Jan. 25, 1977
Appl. No.: 644,884
Filed: Dec. 29, 1975

[51] Int. Cl.[2] ..... F16H 39/46; F15B 11/16

[52] U.S. Cl. ..... 60/445; 60/451; 60/484; 417/212

[58] Field of Search ..... 60/391, 420, 422, 427, 60/445, 449, 451, 484; 417/212

[56] References Cited

U.S. PATENT DOCUMENTS

| | | | |
|---|---|---|---|
| 2,892,311 | 6/1959 | Van Gerpen | 60/422 |
| 2,892,312 | 6/1959 | Allen et al. | 60/427 |
| 3,754,400 | 8/1973 | Parquet | 60/445 |
| 3,826,090 | 7/1974 | Bahl | 60/445 |

*Primary Examiner*—Edgar W. Geoghegan

[57] ABSTRACT

A demand compensated hydraulic system includes a pump responsive to pressurized fluid in a demand feedback pilot line. The pilot line is connected to sense fluid demand between a hydraulic motor and its associated control valve which is closed by servo feedback from the motor. A flow sensitive device is interposed in an output line connecting the pump and the control valve to sense when the flow decreases until it is insufficient to operate the function. At a predetermined decreased flow rate, the flow sensitive device operates to momentarily connect the demand feedback pilot line to a reservoir to cause the pump to go into a stand-by condition.

6 Claims, 2 Drawing Figures

DEMAND COMPENSATED HYDRAULIC SYSTEM WITH FLOW SENSITIVE DEVICE

Matter enclosed in heavy brackets [ ] appears in the original patent but forms no part of this reissue specification; matter printed in italics indicates the additions made by reissue.

BACKGROUND OF THE INVENTION

The invention relates generally to a hydraulic system embodying a demand compensated principle in which the output of a variable displacement pump can be made proportional to the instantaneous load demand of one or more fluid motors powered by the pump and more particularly to a demand compensated hydraulic system which includes a servo motor control valve which controls and is closed by servo feedback from the motor and which further includes a flow sensitive device to return the variable displacement pump to stand-by as the demand approaches zero.

In the past, demand compensated hydraulic systems with a closed loop control of a function tended to "hang up" at load pressure and not allow the pump to return to the stand-by condition when the loads stop moving. This was because the internal pressure drop across the servo motor control valve would cause the pressure at the motor to be insufficient to operate the motor to activate the servo mechanism to close the valve to thereby cause the pump to go into the [stand-up] *stand-by* condition but would be sufficient to feed back through the demand feedback system to prevent the pump from going to the stand-by condition. In this hung up condition, the pump would continue to pump fluid through the demand feedback system resulting in heat build up in the fluid and power loss due to non-standby operation of the pump.

SUMMARY OF THE INVENTION

The present invention provides an improved demand compensated hydraulic system which includes a flow sensitive device to suddenly reduce pressurized fluid in the demand feedback system to prevent the occurrence of hang ups.

The above and additional advantages of the present invention will become apparent to those skilled in the art from a consideration of the following detailed description of the preferred embodiment when taken in conjunction with the accompanying drawing.

DESCRIPTION OF THE PREFERRED EMBODIMENT

Figures 1, 2:
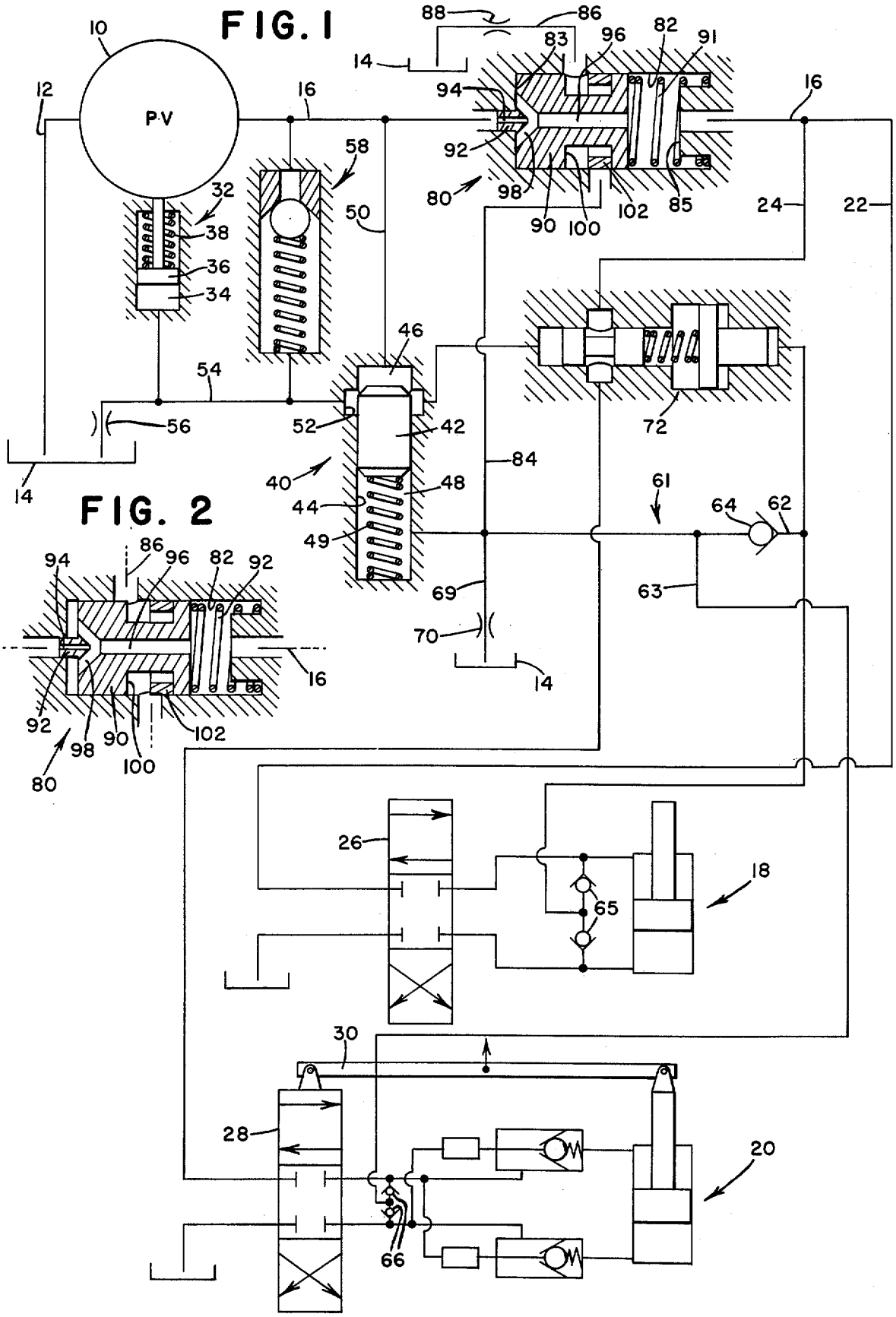
FIG. 1 shows schematically and partially in section, the demand compensated system employed with a plurality of motors including the servo feedback motor and incorporating the present invention.
FIG. 2 shows a portion of the system incorporating the present invention in a different position.

The demand compensated hydraulic system shown in the drawing is generally similar to that shown in the U.S. Pat. No. 2,892,311 granted to H. W. Van Gerpen and a more detailed description of the conventional components may be had by reference thereto.

Referring to FIG. 1, the numeral 10 represents a conventional variable displacement pump having an intake line 12 connected to a reservoir 14 and further having a high pressure output line 16. The output line 16 is connected to a hydraulic system which includes first and second two-way hydraulic motors 18 and 20 which are connected in parallel to the output line 16 respectively by first and second supply branches 22 and 24.

First and second motor control valves 26 and 28, respectively, are interposed in the branches 22 and 24 for selectively causing pressurization of the motors 18 and 20 by the pump 10. Both control valves are shown in their neutral positions. The second control valve 28 includes a servo feedback control device 30 which controls the valve 28 and is responsive to manual input commands as well as to the positioning of the motor 20.

The output of the pump 10 is under the control of a conventional pump *output* control mechanism 32, here comprising a fluid receivable chamber 34 in which means such as a [pistion] *piston* 36 moves in one direction under action of a biasing means in the form of a spring 38 to increase pump output and in the opposite direction to decrease pump output in response to pressurized fluid admitted to the chamber 34 in response to the position of a conventional demand compensating or demand control valve indicated in its entirety at 40.

The demand control valve 40 comprises a piston 42 which separates a bore 44 into pressure and pilot chambers 46 and 48, respectively, and which is biased toward the pressure chamber 46 by a spring 49. The pressure chamber 46 is connected via a control line 50 to the output line 16 and by a port chamber 52 on the demand control valve 40 to the output control mechanism chamber 34 via a line 54. The control line 54 further leads via an orifice 56 to the reservoir 14. A conventional relief valve 58 is connected between the lines 16 and 54 to dump [excessively] *excessively* pressurized fluid to the line 54 for ultimate exhaust to the reservoir 14 and at the same time afford instantaneous pressure rise in the chamber 34 for moving the pump out of stroke to decrease the pump output. The pilot chamber 48 of the demand valve means 40 is connected to a feedback or pilot circuit 61 which includes first and second feedback branches 62 and 63. The first feedback branch 62 contains a check valve 64 and is connected to the first supply branch 22 through a check valve assembly 65. The second feedback branch 63 is connected to the second supply branch 24 through a check valve assembly 66. The pilot circuit includes a reservoir line 69 having a restrictor 70 therein connected to the reservoir 14.

A conventional priority valve 72 is interposed in the second branch 24 and is connected to the first feedback branch 62 in parallel with the check valve 64. The priority valve 72 is further connected to the port chamber 52 of the demand valve 40. The priority valve 72 opens the second supply branch 24 when the pressure in the chamber 52 is at a predetermined high value and fully closes the second branch 24 when the chamber pressure decreases to a predetermined low value as fully described in the Van Gerpen patent.

A flow sensitive device 80 is disposed in the output line 16 such that a chamber 82 therein is connected at one end 83 to the pump 10 and at the other end 85 to the first and second supply branches 22 and 24. An additional reservoir line 84 located between the ends 83 and 84 connects the chamber 82 to the pilot circuit 61. A further portion of the additional reservoir line 84 designated by 86 is connected to the chamber 82 between the line 84 and the end 83 to connect the chamber 82 to the reservoir 14. The additional reservoir line 86 includes a restrictor 88.

Slidably received within the chamber 82 is a piston 90 biased by a spring 91 towards the pump connected end of the chamber 82. At one end of the piston 90 is a protrusion 92 which extends into the pump connected output line 16 and has a restricted fluid passage 94 therein. The restricted fluid passage 94 connects with a through passage 96 which is open to the supply branch connected end of the chamber 82. Connecting the pump end of the chamber 82 with the through passage 96 are a plurality of radial passages 98. The piston 90 further has an annular groove 100 therein which contains an annular ring 102. The axial length of the annular ring 102 is less than the axial length of the groove 100 and is sized so as to operate as will later be explained.

In operation, assuming that both the control valves 26 and 28 are in neutral, the pressure in the output line 16 and in the supply branches 22 and 24 ahead of the control [vlaves] *valves* 26 and 28 will be determined by the load applied by the spring 49 in the demand control valve 40. [Consequently, the port chamber 52 in the demand control valve 40.] Consequently, the port chamber 52 will be open to fluidly connect the control lines 50 and 54 for supplying fluid to the output control mechanism 32. A small, steady flow is supplied, the rate of which is [dependedt] *dependent* for one thing on the size of the orifice 56. Thus, the pump output is relatively low, being sufficient only to maintain the flow just described at a corresponding pressure which may be considered the "stand-by" pressure. At this time there will be no flow in the pilot circuit 61, since any fluid trapped in the circuit can bleed through the orifice 70 to the reservoir 14.

Upon moving the control valve 28 out of its neutral position, so as to establish fluid communication to the motor 20, the system will impose a certain demand on the pump 10. The pressure increases in the feedback branch 63 faster than it can be relieved through the reservoir line 69 and is communicated to the pilot chamber 48 of the demand valve 40 and this pressure, plus the pressure of the spring 49, will cause the piston 42 to close the port chamber 52. Fluid trapped in the line 54 under the pressure of the spring 38 will bleed through the orifice 56 without being made up, causing the piston 36 to move to increase the output of the pump 10 and increase the pressure and flow in the output line 16 to satisfy the system demand. As the flow in the output line 16 increases, it moves the piston 90 towards the end 85 of the chamber 82 unit the protrusion 92 clears the pump connected output line 16. Movement of the piston 90 closes the reservoir line 86 before the additional reservoir line 84 is opened by displacement of the ring 102, thus the pilot circuit 61 is not disturbed during increasing fluid flow. Once the protusion 92 clears the pump connected output line 16, fluid passes through the passages 98 and 96 into the branch connected output line 16 with a minimum of resistance through the flow sensitive device 80.

As the hydraulic motor 20 approaches its desired position, the servo feedback mechanism 30 causes the direction control valve 28 to move towards its neutral position. As the valve 28 approaches its neutral position, the pressure drop across its internal metering port reaches a point where insufficient pressure can be supplied to the fluid motor 20 to move the fluid motor 20 to completely close the valve 28. In this position the valve 28 has sufficient flow across the metering port, however, to maintain a pressurization of the demand valve 40 through the pilot circuit 61 which causes the pump 10 to provide some small flow output. As the pump output decreases towards the small flow output, the flow through the flow sensitive device 80 decreases to a point which allows the spring 91 to move the piston 90 towards the end 83 of the chamber 82. As the piston 90 moves, the annular ring 102 will remain stationary in a position clear of the additional reservoir line 84. Thus, when the piston 90 moves to open the additional reservoir line 86 to the groove 100, the groove 100 will also be open to the additional reservoir line 84 to present a second connection to the reservoir 14 as shown in FIG. 2. With two connections to the reservoir through line 69 and through line 84 and 86, a momentary disturbance or reduction of pressure will be introduced into the pilot circuit 61 which is sufficient to open the demand valve 40 to cause the pump 10 to decrease its output pressure to its stand-by level and to stop the flow in the supply branch 24. The stopping of the flow in the supply branch 24 feeds back to cause stand-by operation of the pump 10.

Subsequently, as the piston 90 reaches the end of its travel, it moves the annular ring 102 to a position which blocks the line 84 and brings the flow sensitive device 80 back to its initial condition. Thus, the flow sensitive device 80 prevents occurrence of the situation wherein the flow across the control valve is sufficient to prevent the pump from going to a stand-by condition while being insufficient to operate the function to close the valve to cause the pump to go into the stand-by condition.

While the invention has been described in conjunction with a specific embodiment, it is to be understood that many alternatives, modifications and variations will be apparent to those skilled in the art in light of the aforegoing description. Accordingly, it is intended to embrace all such alternatives, modifications, and variations which fall within the spirit and scope of the appended claims.

I claim:

1. An improved hydraulic system of the type having a variable displacement pump with output control means biased to increase pump output fluid flow and responsive to an input of pressurized fluid to decrease pump output fluid flow, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line [further connected to the output line between] *operatively associated with* the motor control valve and *pressurized by the pressurized fluid to* the motor *when the motor control valve is moved from a neutral position,* wherein the improvement comprises: means operatively associated with the output line, the pilot line, and a fluid reservoir responsive to [descreasing] *decreasing* flow through the output line to connect the pilot line to the reservoir and responsive to increasing fluid flow in the output line to block the pilot line from the reservoir.

2. An improved hydraulic system of the type having a variable displacement pump with output control means biased to increase pump output fluid flow and responsive to an input of pressurized fluid to decrease pump output fluid flow, a fluid motor, an output line connected between the pump and the motor, a motor control valve interposed in the output line and having servo feedback from the motor for selectively opening and closing the output control means, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line [further connected to the output line between] *operatively associated with* the motor control valve and *pressurized by the pressurized fluid to* the motor *when the motor control valve is moved from a neutral position,* and a restricted reservoir *line*, wherein the improvement comprises: an additional reservoir line connecting the pilot line to the reservoir; and flow sensitive means interposed in the additional reservoir line and operatively associated with the output line responsive to fluid flow in the output line to block the flow of fluid from the pilot line through the additional reservoir line and to a decrease in the fluid flow to momentarily allow the flow of fluid from the pilot line through the additional reservoir line whereby the pressurized fluid in the pilot line is momentarily disturbed.

3. An improved hydraulic system of the type having a variable displacement pump with output control means biased to increase pump output fluid flow and responsive to an input of pressurized fluid to decrease pump output fluid flow, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line [further connected to the output line between] *operatively associated with* the motor control valve and *pressurized by the pressurized fluid to* the motor *when the motor control valve is moved from a neutral position,* and a restricted reservoir line connecting the pilot line to a fluid reservoir, wherein the improvement comprises: flow sensitive means interposed in the output line between the pump and the motor control valve and connected by a first portion of an additional reservoir line to the pilot line and by a second portion of the additional reservoir line to the reservoir; said flow sensitive means including piston means having fluid passage means and ring means therein; said piston means responsive to increasing pump output fluid flow to successively block the fluid passage means from the first and second portions and to decreasing pump output fluid flow to successively connect the fluid passage means to the second and first portions; and said ring means responsive to piston means response to increasing pump output fluid flow to successively block and not block the fluid passage means from the first portion and to piston means response to decreasing pump output fluid flow to successively connect and block the fluid passage means from the first portion whereby the first and second portions are connected to the fluid passage means only with decreasing pump output fluid flow.

4. An improved hydraulic system of the type having a variable displacement pump with output control means biased to increase pump output fluid flow and responsive to an input of pressurized fluid to decrease pump output fluid flow, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line further connected to the output line between the motor control valve and the motor, and a restricted reservoir line connecting the pilot line to a fluid reservoir, wherein the improvement comprises: flow sensitive means interposed in the output line between the pump and the motor control valve, said flow sensitive means having a chamber provided therein; said chamber connected at one end to the pump connected portion of the output line and at the other end to the valve connected portion of the output line; a first fluid line connected at one end to the pilot line proximate the restricted reservoir line and at the other end to the chamber between the ends of the chamber; a second fluid line connected at one end to the reservoir and at the other end to the chamber between the connection of the first line and the one end of the chamber; piston means slidably positioned in the chamber and having an axial hole provided therein, said piston means having an annular groove therein, said piston means slidable toward the other end of the chamber in response to increasing pump output fluid flow to successively block the annular groove from the first and second lines; means biasing the piston means toward the one end of the chamber to successively connect the annular groove to the second and first lines; and ring means positioned in the annular groove and slidable in the chamber by the piston means sliding toward the other end of the chamber to successively block and not block the annular groove from the first line and by the piston means sliding toward the one end of the chamber to successively connect and block the annular groove from the first line whereby the first and second lines are connected to the annular groove only with decreasing fluid flow.

5. The hydraulic system as claimed in claim 4 further including restrictor means disposed in the second line.

6. The hydraulic system as claimed in claim 4 wherein the piston means includes means for minimizing resistance of the flow sensitive means to pump output fluid flow.

* * * * *